United States Patent
Parent (10) Patent No.: US 9,447,599 B1
(45) Date of Patent: *Sep. 20, 2016

(54) SUPPORT POLE WITH A PREFABRICATED ENGAGING THREAD AND METHOD OF USING THE SAME

(71) Applicant: Richard Parent, Spring Grove, IL (US)

(72) Inventor: Richard Parent, Spring Grove, IL (US)

(73) Assignee: US Post Co., Inc., Spring Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,703

(22) Filed: Jun. 17, 2015

(51) Int. Cl.
| F16M 13/00 | (2006.01) |
| E04H 12/22 | (2006.01) |
| A47G 29/122 | (2006.01) |
| E04H 17/22 | (2006.01) |
| F16B 1/00 | (2006.01) |

(52) U.S. Cl.
CPC ....... *E04H 12/2223* (2013.01); *A47G 29/1216* (2013.01); *E04H 17/22* (2013.01); *F16B 2001/0035* (2013.01)

(58) Field of Classification Search
USPC .......................... 248/545, 530, 532, 156, 345
See application file for complete search history.

(56) References Cited

U.S. PATENT DOCUMENTS

| 3,519,234 A * | 7/1970 | Matson ................... E04H 17/18 144/195.5 |
| 4,233,769 A * | 11/1980 | Archer ...................... G09F 7/20 248/530 |
| 4,524,533 A * | 6/1985 | Still, Jr. ..................... G09F 7/18 248/156 |
| 4,717,110 A * | 1/1988 | Fohrman ................... G09F 7/20 211/89.01 |
| 4,765,277 A * | 8/1988 | Bailey .................. E04H 12/182 119/428 |
| 5,067,683 A * | 11/1991 | Wager ....................... F41J 1/10 248/156 |
| 5,181,335 A * | 1/1993 | Todd ......................... G09F 7/18 248/125.1 |
| 5,492,429 A * | 2/1996 | Hodges ............... E04H 12/2215 248/156 |
| 5,502,910 A * | 4/1996 | Lucchesi ................... G09F 7/22 173/91 |
| 5,833,181 A * | 11/1998 | DesNoyers ............... G09F 7/22 248/156 |
| 5,921,035 A * | 7/1999 | Kempf ................ E04H 12/2223 248/545 |
| 6,820,379 B1 * | 11/2004 | Krinner ............... E04H 12/2223 108/156 |
| 7,007,910 B1 * | 3/2006 | Krinner ............... E04H 12/2223 248/156 |
| 7,246,783 B2 * | 7/2007 | Harold .................... A45B 25/00 135/16 |
| 8,407,949 B2 * | 4/2013 | Kellner ................... E02D 5/801 248/156 |
| 2002/0014570 A1 * | 2/2002 | Jenny ..................... E02D 5/801 248/545 |
| 2006/0060749 A1 * | 3/2006 | Dahlstrom ................ A45F 3/44 248/545 |
| 2008/0156957 A1 * | 7/2008 | Nervi ........................ G09F 7/22 248/530 |
| 2012/0104190 A1 * | 5/2012 | Parent ................. A47G 29/1216 248/121 |

* cited by examiner

*Primary Examiner* — Terrell McKinnon
*Assistant Examiner* — Michael McDuffie
(74) *Attorney, Agent, or Firm* — Justin Lampel (57) ABSTRACT

The present invention generally relates to a support pole having a spike unit with a prefabricated engaging thread and a method of using the same. The top of the spike unit is internally secured within a bottom opening of the support pole by an epoxy wherein the bottom of the support pole rests on a generally circular ridge of the spike unit. The support pole is especially suitable for use with mailbox posts, birdhouse posts, volleyball posts, fences, or the like. The support pole may be securely inserted or removed from the ground without the need for concrete, shovels and other numerous tools. The support pole has an opening on its exterior side for temporarily receiving a perpendicularly inserted rod which is inserted therein so as to provide leverage for driving the support pole into the ground by rotating the support pole clockwise or counter-clockwise.

6 Claims, 7 Drawing Sheets

SUPPORT POLE WITH A PREFABRICATED ENGAGING THREAD AND METHOD OF USING THE SAME

BACKGROUND OF THE INVENTION

A support pole having a spike unit with a prefabricated engaging thread and a method of using the same is provided. The top of the spike unit is internally secured within a bottom opening of the support pole by an epoxy wherein the bottom of the support pole rests on a generally circular ridge of the spike unit. The support pole is especially suitable for use with mailbox posts, birdhouse posts, volleyball posts, fences, or the like. The support pole may be securely inserted or removed from the ground without the need for concrete, shovels and other numerous tools. The support pole has an opening on its exterior side for temporarily receiving a perpendicularly inserted rod which is inserted therein so as to provide leverage for driving the support pole into the ground by rotating the support pole clockwise or counter-clockwise.

Over the years, numerous devices and methods have been developed to secure a pole in the ground. For example, U.S. Pat. No. 7,438,273 to Tota discloses an anchor for securing an object to the ground. The anchor is especially useful for securing, either temporarily or permanently, fixing objects to the ground, such as signs, poles, mailbox posts, tent or net supports. Placement of the device requires no digging and few or no tools, and visible damage to the landscape is reduced. Advantageously, subterranean obstructions can be detected and avoided while securing the device to the ground, thereby protecting utility lines from damage. Typically, little strength and low torque is needed to secure the anchor to the ground.

Further, U.S. Pat. No. 7,175,141 to Bolinder discloses a removable sign support system for supporting a sign on the ground which includes a substantially upright support post, configured to removably receive a sign post. The support post has a substantially horizontal base affixed to its bottom end, with a plurality of spikes downwardly extending from the base into the ground, and a lifting connection fixedly attached to the support post. A removal device is provided for removing the support post from the ground, and includes a moveable column having a bottom end configured to bear upon the top of the ground near the base of the support post, and a lever arm pivotally attached to the moveable column. The removal device is configured to pull the spikes upwardly out of the ground by engaging the lever arm with the lifting connection and applying a substantially upward force thereon. Finally, U.S. Publication No.: 20120104190 to Parent further discloses a support pole having a spike with a prefabricated engaging thread.

However, these support poles fail to disclose a support pole that has a permanently secured digging mechanism, which allows for easy insertion and removal of the support pole into the ground. A need, therefore, exists for an improved support pole for use in connection with securing poles into the ground.

SUMMARY OF THE INVENTION

The present invention generally relates to a support pole having a spike unit with a prefabricated engaging thread and a method of using the same. The top of the spike unit is internally secured within a bottom opening of the support pole by an epoxy wherein the bottom of the support pole rests on a generally circular ridge of the spike unit. The support pole is especially suitable for use with mailbox posts, birdhouse posts, volleyball posts, fences, or the like. The support pole may be securely inserted or removed from the ground without the need for concrete, shovels and other numerous tools. The support pole has an opening on its exterior side for temporarily receiving a perpendicularly inserted rod which is inserted therein so as to provide leverage for driving the support pole into the ground by rotating the support pole clockwise or counter-clockwise.

An advantage of the present support pole and method of using the same is that the present support pole does not require pre-digging.

And another advantage of the present support pole and method of using the same is that the present support pole may allow a user to easily adjust the height of the support pole with little effort by merely rotating the support pole.

Yet another advantage of the present support pole and method of using the same is that the present support pole does not require concrete, asphalt or the like to be used.

Still another advantage of the present support pole and method of using the same is that the present support pole does not deteriorate from rust as commonly occurs when concrete is used to secure traditional metal poles.

And still another advantage of the present support pole and method of using the same is that the present support pole may be installed and/or removed without a person needing to bend over as is common in installing most poles using concrete. As a result, the support pole may be inserted in a more directly vertical position compared to using concrete.

And another advantage of the present support pole and method of using the same is that the present support pole may be reused, unlike other poles which are secured into the ground via concrete which must be discarded after use due to the concrete.

An advantage of the present support pole and method of using the same is that the present device eliminates the uneven ground that often occurs when concrete eventually rises above ground level over time in concrete anchored posts.

Yet another advantage of the present support pole and method of using the same is that little torque is needed to twist the present support pole and to secure the present support pole into the ground.

An advantage of the present support pole and method of using the same is that the present support pole does not need any tools to insert the same into the ground or to remove the same from the ground.

Yet another advantage of the present support pole and method of using the same is that the user may easily transport and store the support pole.

Still another advantage of the present support pole and method of using the same is that the user may easily remove the support pole from the ground and reinsert and reuse the support pole in an alternative location.

And another advantage of the present support pole and method of using the same is that the user may change the items secured to the present support pole, such as mailboxes, birdhouses, house signs, etc.

Another advantage of the present support pole and method of using the same is that, in an embodiment, the spike unit of the device is solid while the main body is substantially hollow therein allowing the spike unit to provide strength in securing the device into the ground while still being lightweight overall.

Still further, an advantage is that the present support pole and method of using the same is that the present support pole may have a plurality of vertical ridges that provide additional strength to the support pole.

And another advantage of the present support pole is that the present device may have a reflective paint which allows for easy visibility of the support pole in diminished light.

For a more complete understanding of the above listed features and advantages of the support pole with a prefabricated engaging thread reference should be made to the following detailed description of the preferred embodiments and to the accompanying drawings.

DETAILED DESCRIPTION OF THE PREFERRED EMBODIMENTS

The present invention generally relates to a support pole having a spike unit with a prefabricated engaging thread and a method of using the same. The top of the spike unit is internally secured within a bottom opening of the support pole by an epoxy wherein the bottom of the support pole rests on a generally circular ridge of the spike unit. The support pole is especially suitable for use with mailbox posts, birdhouse posts, volleyball posts, fences, or the like. The support pole may be securely inserted or removed from the ground without the need for concrete, shovels and other numerous tools. The support pole has an opening on its exterior side for temporarily receiving a perpendicularly inserted rod which is inserted therein so as to provide leverage for driving the support pole into the ground by rotating the support pole clockwise or counter-clockwise.

Figure 1:
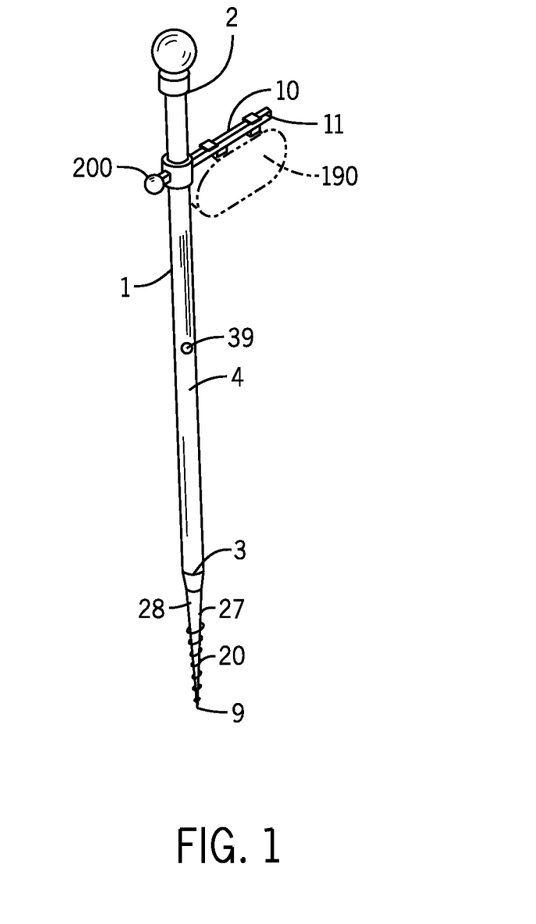
FIG. 1 illustrates a front perspective view of the support pole with a prefabricated engaging thread.
Figure 2:
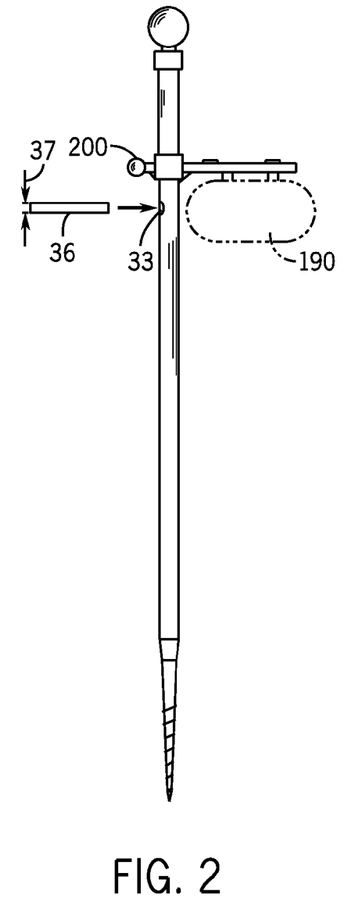
FIG. 2 illustrates a front plan view of the support pole with a prefabricated engaging thread.
Figures 8, 9, 10:
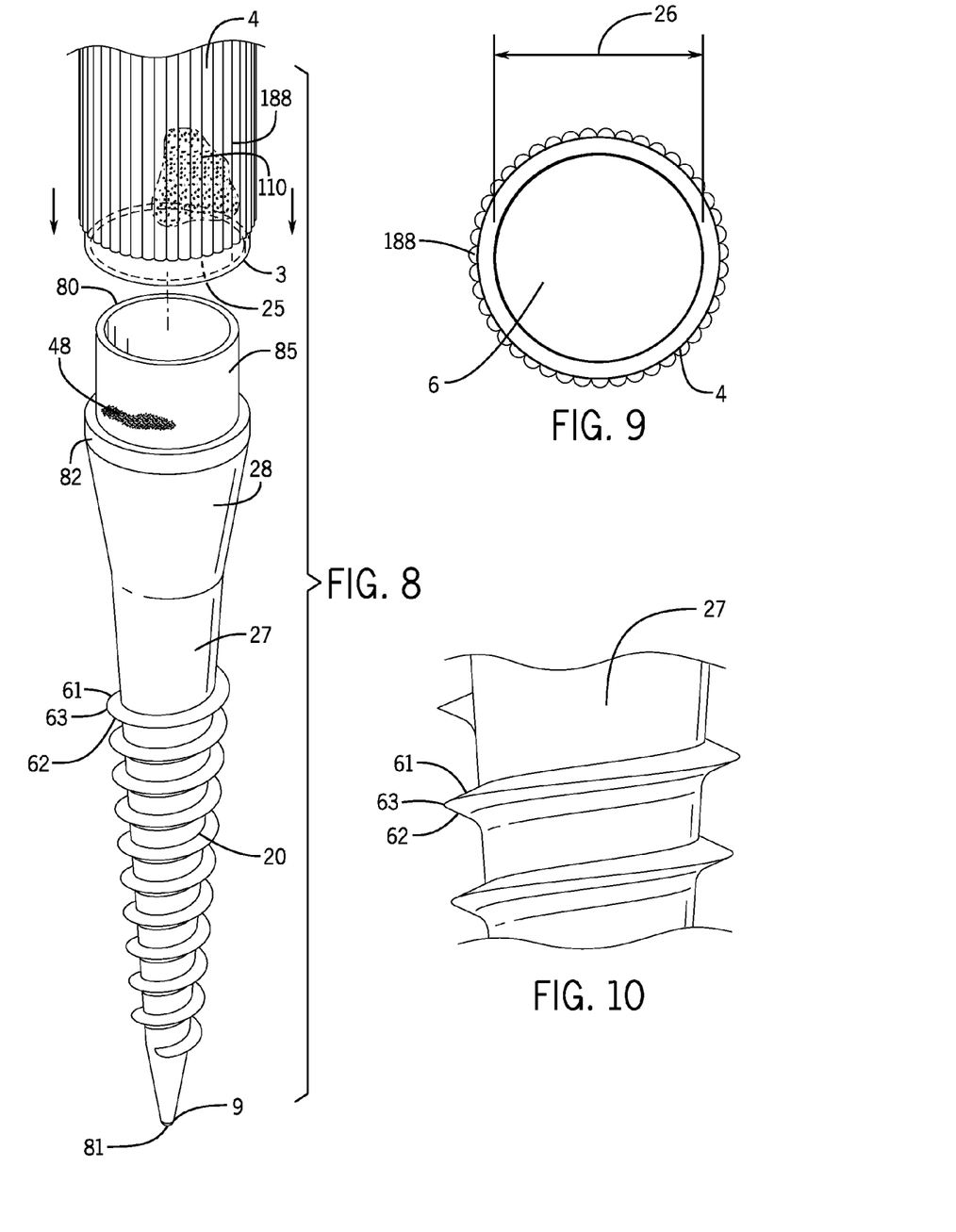
FIG. 8 illustrates a view of the bottom of the support pole being inserted into the spike unit.
FIG. 9 illustrates a cross-section of the main body of the support pole.
FIG. 10 illustrates a cross-section of the engaging thread of the spike unit.

Referring first to FIG. 1, a support pole (or "post") 1 for a sign, mailbox, birdfeeder, volleyball net, fence or the like is provided. The support pole 1 may have a top 2, a bottom end 3, and an exterior side 4. In the present drawings the support pole 1 is illustrated as cylindrical, having a circumference; however, the support pole 1 may have any suitable cross-section such as a square, hexagon, octagon or the like. The support pole 1 may also have an interior 6 (FIG. 9). The support pole 1 may be largely constructed from metal, plastic, or the like. Preferably, the support pole 1 may be strong enough to stand up to the outdoor elements and may also be strong enough so as to be able to displace dirt while being inserted into the ground 100.

The bottom end 3 of the support pole 1 may have an opening 25 (FIG. 8). The opening 25 at the bottom end 3 of the support pole 1 may have a diameter 26 (FIG. 9). In an embodiment, the diameter 26 of the opening 25 is approximately two to six inches; however, the actual diameter 26 of the opening 25 of the support pole 1 may vary a great deal depending on the desired use of the particular support pole 1. In an embodiment, a spike unit 27 may be permanently secured to the bottom end 3 of the support pole 1. In an embodiment, the spike unit 27 of the device 1 may be solid while the main body of the support pole 1 is substantially hollow therein allowing the spike unit 27 to provide strength in securing the device 1 into the ground 100 while still being lightweight overall. The spike unit 27 may be secured to the bottom end 3 of the support pole 1 by an epoxy 48. By using an epoxy 48 to permanently secure the spike unit 27 to the main body of the pole 1, the installation process becomes much easier in that the installed has a sight line to see if the device 1 is being inserted in a perfectly straight orientation with respect to the ground. In particular, in other pole designs, a user often attempts to secure a bottom anchor portion into the ground first and then tries to secure the main post to the anchor only to discover the post is four to six inches off center and not perfectly perpendicular to the ground 100. In the present device, since the entire unit is a single element, a user can see if the device is being inserted in a perfectly straight manner.

Figure 5:
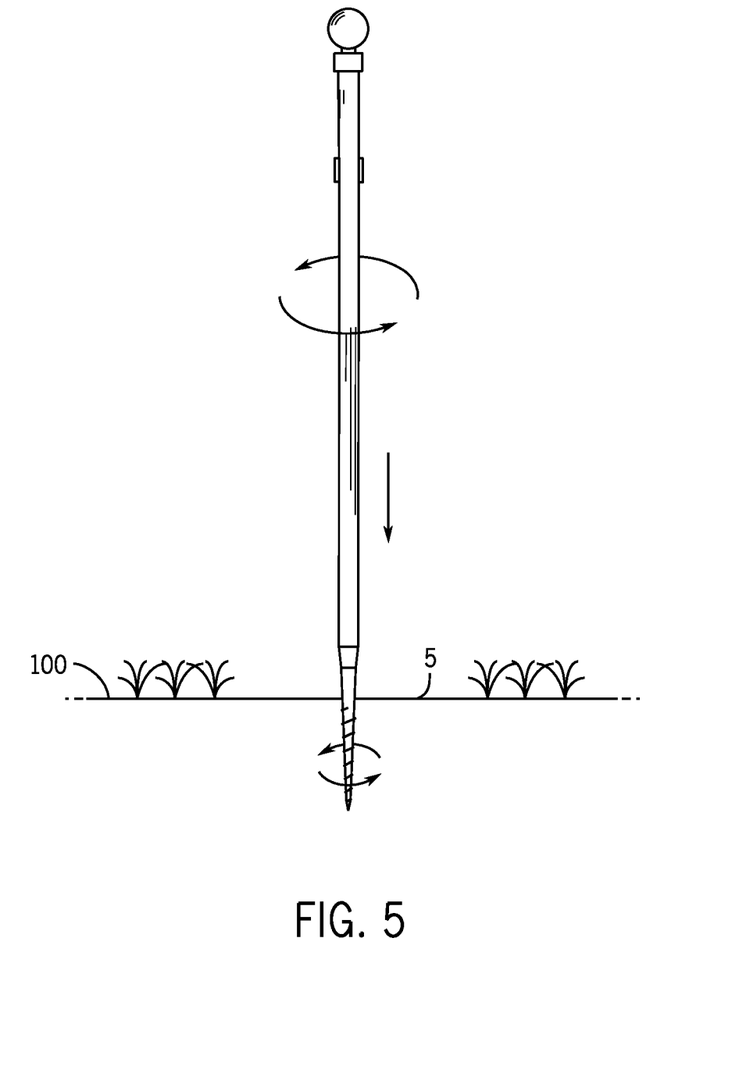
FIG. 5 illustrates a side view of the support pole being inserted into the ground.
Figure 6:
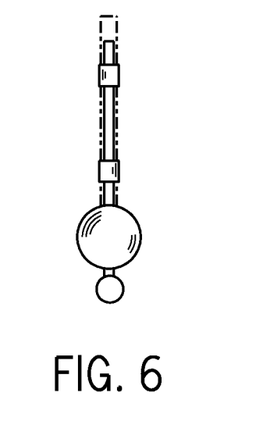
FIG. 6 illustrates a top plan view of the support pole with a prefabricated engaging thread.
Figure 7:
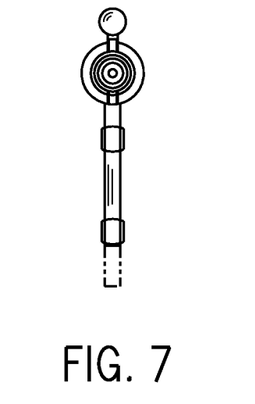
FIG. 7 illustrates a bottom plan view of the support pole with a prefabricated engaging thread.

In an embodiment, the spike unit 27 may have a sharpened tip 9. The sharpened tip 9 may be suitable for breaking into the ground 100 (FIG. 5). Further, located on the spike unit 27 of the support pole 1 may be an engaging thread 20 that runs around an external surface 28 of the spike unit 27 of the pole 1. The engaging thread 20 may help to displace dirt as the pole 1 is inserted into the ground. Further, the engaging thread 20 may provide additional surface area which contacts the ground 100, which may increase the stability of the support pole 1 while the spike unit 27 (and possibly a portion of the bottom end 3 of the pole 1) is inserted in the ground 100. The engaging thread 20 may run at approximately a ten to twenty degree angle with respect to the ground 100.

Referring now to FIG. 8, in an embodiment, the spike unit 27 may have a top 80 and a bottom 81 wherein the sharpened tip 9 is located at the bottom 81 of the spike unit 27. Located near the top 80 of the spike unit 27 may be a generally circular ridge 82. The generally circular ridge 82 may be located approximately two to three inches below the top 80 of the spike unit 27. In an embodiment the portion (#85 in FIG. 8) of the spike unit 27 above the generally circular ridge 82 may be permanently secured within the opening 25 at the bottom end 3 of the support pole 1 and therefore not visible when the device is fully assembled. The generally circular ridge 82 may therein prevent the bottom end 3 of the support pole 1 from extending beyond the generally circular ridge 82 of the spike unit 27.

In the preferred embodiment, the portion 85 of the spike unit 27 above the generally circular ridge 82 of the spike unit 27 may be three inches in height. More specifically, it is important for the portion 85 of the spike unit 27 above the generally circular ridge 82 to be three inches in height so that the spike unit 27 does not accidentally become dislodged from the main body unit of the support pole 1 in the event a side pressure is applied to the support pole 1. The increased three inch height of the portion 85 of the spike unit 27 above the generally circular ridge 82 not only provides increased support by physically contacting a greater surface are of the interior of the main body of the support pole 1 but also provides a great surface area for securing the epoxy 48 to the interior of the support pole 1. It should be understood that the height of the portion 85 of the spike unit 27 above the generally circular ridge 82 may be more or less than three inches in alternative embodiments, but that the preferred embodiment height is three inches.

The generally circular ridge 82 of the spike unit 27 may be horizontal and may run substantially perpendicular to a plurality of ridges 188 which may, in an embodiment, be located on the exterior side 4 of the main body of the support pole 1. The generally circular ridge 82 may be located near the top 80 of the spike unit 27 of the device 1 and may further serve to indicate the height-level at which the support pole 1 is recommended to be inserted into the ground 100. Further, the generally circular ridge 82 may provide additional surface area contacting the ground 100 to the support pole 1 and may help maintain the support pole 1 in an upright and vertical position with respect to the ground 100.

In an alternative embodiment, the generally circular ridge 82 may also be partially used as a brace for a person to stand on while inserting the pole 1 into the ground 100; therein increasing the downward force while the support pole 1 is being inserted into the ground 100. In an embodiment, the pole 1 may be twisted enough such that the generally circular ridge 82 may be actually moved underground while the support pole 1 is secured into the ground 100.

In an embodiment, the engaging thread 20 of the spike unit 27 of the support pole 1 may be two-sided such that the engaging threads 20 compact the soil so that the spike unit 27 and possibly the bottom end 3 of the support pole 1 may be inserted into the ground in a stronger, more studier fashion. More specifically, the engaging thread 20 of the spike unit 27 of the support pole 1 may have a first side 61, a second side 62 and a central ridge 63. The first side 61 may face upward, toward the top 80 of the spike unit 27 of the support pole 1 while the second side 62 faces downward toward a bottom 81 of the spike unit 27 of the support pole 1. The first side 61 may be largely identical to the second side 62 except for the direction each side faces. The first side 61 and the second side 62 may meet at and form the central ridge 63. The first side 61 and second side 62 of the engaging thread 20 may angle approximately forty-five to sixty-five degrees with respect to the support pole 1. Typically, a screw would have a thread wherein one side of the thread is angled less than ninety degrees with respect to a central shaft while the second side is angled greater than ninety degrees with respect to the shaft. As a result, a typical screw thread is substantially flat wherein the engaging thread 20 of the present device 1 is a largely symmetrical engaging thread 20 with a triangular-shaped cross section (FIG. 10).

As illustrated in FIGS. 8 and 10, in an embodiment, the angles of the first side 61 and the second side 62 of the engaging threads 20 (or "tines") create a cross-section which is triangular in shape. In particular, the cross-section of the engaging threads 20 is substantially similar to an equilateral triangle as opposes to a thin inclined plane as is common with most screws. Providing a thick cross-section of the engaging threads 20 helps prevent the engaging threads 20 from accidentally slicing through cables located underground. Further, because the tines are thicker near the core of the spike unit 27, small stones are moved away from the spike unit 27 instead of getting trapped against the core of the spike unit 27. Still further, the thicker tines of the spike unit 27 provide more surface area which therein creates more contact with the ground and further allows the spike unit 27 to compact the soil for a more solid hold over typical thin tine screws.

Figure 11:
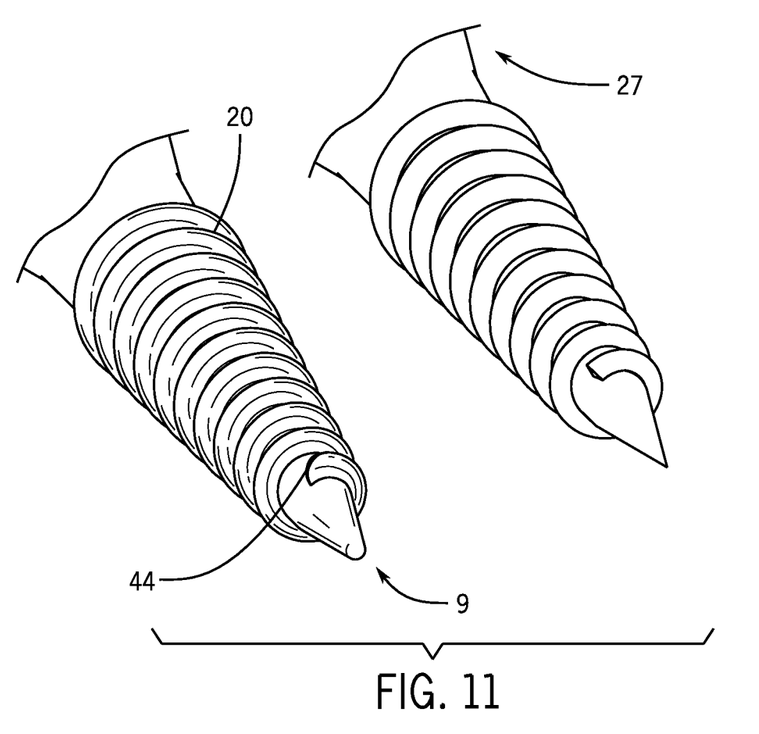
FIG. 11 illustrates the tip of the present device compared to a prior art tip of a typical screw.

Referring now to FIG. 11, in an embodiment, the engaging thread 20 of the tip 9 of the present spike unit 27 may terminate at a rounded edge 44. Compared to the Prior Art in FIG. 11, the rounded edge 44 termination of the engaging thread 20 allows the spike unit 27 to avoid cutting cables which may be located underground. Instead, the rounded edge 44 of the engaging thread 20 merely diverts any underground cables away from the spike unit 27.

In an alternative embodiment (like the support pole illustrated in FIG. 8), the exterior surface 4 of the support pole 1 may further have a plurality of extending ridges 188. It should be understood that in an alternative embodiment (FIG. 1), the exterior side 4 of the support pole 1 is smooth or has an alternative surface. The plurality of ridges 188 may extend vertically from substantially the top 2 of the pole 1 toward the bottom 3 of the pole 1 and may extend slightly outward from the exterior side 4. The plurality of ridges 188 may be parallel with respect to one another. The plurality of ridges 188 may not only be ornamentally pleasing, but may also help prevent the support pole 1 from unintentionally shifting when inserted into the ground 100 (when it is desired to insert the device 1 into the ground past the generally circular ridge 82). More specifically, the plurality of ridges 188 may provide additional surface area (near the bottom portion of the support pole 1) which may come into direct contact with the ground 100; therein helping reduce possible shifting of the support pole 1 with respect to the ground 100 once the support pole 1 is secured in the ground 100. Further, the plurality of ridges 188 may provide additional surface area and additional angles wherein a reflective paint 110 (FIG. 8) may increase the chances of a motorist being able to see the support pole 1 in diminished light.

The plurality of ridges 188 may also reduce the appearance of scratches or marks that otherwise would appear on a support pole 1 with a smooth exterior surface 4 over time. As a result, reducing the appearance of scratches and marks also allow for the reflective paint 110 to remain on the exterior surface 4 therein increasing visibility of the support pole 1 and safety. Still further, the plurality of ridges 188 increases the strength of the support pole 1 and reduces possible damage by a side impact of a vehicle with the support pole 1.

In an embodiment, the support pole 1 may further have an extended arm portion 10 having a top 11. The extended arm portion 10 may extended substantially perpendicular with respect to the main body of the pole 1. The extended arm portion 10 may support a sign 190, mailbox, birdfeeder, house sign, fence or the like. Preferably, the extended arm 10 may extend outward at approximately ninety degrees with respect to the main body of the support pole 1. Accordingly, the extended arm 10 may remain largely parallel with respect to the ground 100 and perpendicular with respect to the main body of the support pole 1.

As stated above, the extended arm portion 10 of the support pole 1 may be used to hang or otherwise secure a sign 190, mailbox, birdfeeder, house sign, fence or the like. The figures illustrate a sign being hung from the extended arm portion 10; however it should be understood that any suitable device may be secured to the extended arm portion 10 of the support pole 1.

To insert the support pole 1 into the ground 100, the user may electively first wet the ground 100 with some water so as to lightly soften the dirt in the ground 100. The user may then place the sharpened tip 9 of the bottom end 81 of the spike unit 27 of the support pole 1 over the spot wherein the user wishes the support pole 1 to be placed. With a downward and twisting force, the user then screws the support pole 1 into the ground 100. A benefit of the device 1 is that minimal torque is required to secure the support pole 1 into the ground 100. Further, the support pole 1 does not require the pre-digging of a hole prior to insertion of the support pole 1 into the ground 100.

The user may electively grasp the support pole 1 while twisting the support pole 1 into the ground 100. In addition to grasping the main body of the support pole 1, the user may also gain leverage and force by grasping the extended arm 10 of the support pole 1 and a ball 200 portion (defined below). A user may also lean on the support pole 1 to apply a downward pressure while securing the support pole 1 into the ground 100. As a result, a user may insert the pole 1 into the ground 100 without the need for any tools.

In an embodiment, a ball portion 200 may extend outward from the main body of the support pole 1. The ball 200 may extend opposite the extended arm 10 and along the same planar axis. The ball 200 may provide a counter-weight and may help balance the extended arm 10 and, for example, a mailbox, which may be located on top 11 of the extended arm 10. More specifically, the ball portion 200 may have substantially the same weight as the extended arm 10 portion so as to counter-balance the entire pole 1. In addition, the ball 200 may allow a user to evenly apply pressure to both sides of the support pole 1 while the support pole 1 is being inserted or removed from the ground 100. The curved shape of the ball 200 may allow the user to grasp the support pole 1 by hand without grasping any sharp edges; therein allowing the user to more easily rotate the support pole 1 during insertion or removal of the support pole 1.

Figure 3:
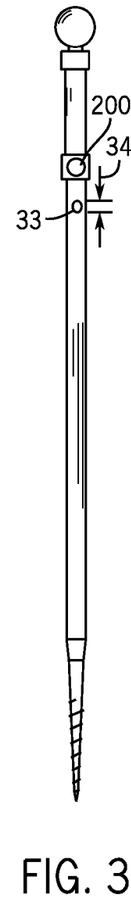
FIG. 3 illustrates a side plan view of the support pole with a prefabricated engaging thread.
Figure 4:
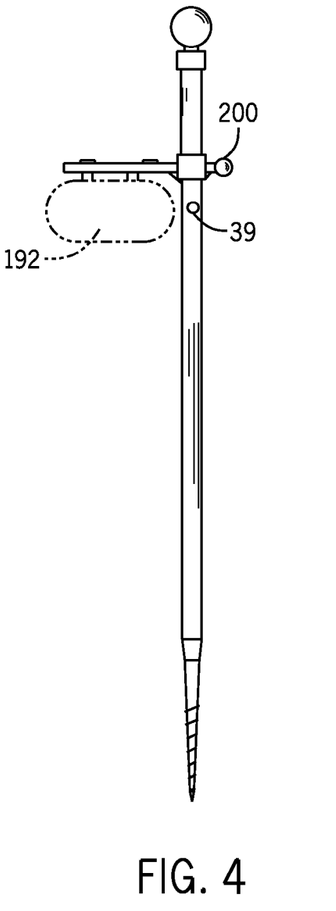
FIG. 4 illustrates a back plan view of the support pole with a prefabricated engaging thread.

In an embodiment, the exterior side surface 4 of the support pole 1 may have at least one opening 33. The opening 33 (FIG. 3) may have a diameter 34. The opening 33 may receive a poll, rod or the like 36 having a similar diameter 37 such that the user may use the poll, rod or the like 36 to provide torque to twist the support pole 1 therein securing the support pole 1 into the ground 100. Once the support pole 1 is in place in the ground 100, the poll, rod or the like 36 may be removed from the opening 33 and, in an embodiment, a cap 39 may be secured over the opening 33 to cover the opening 33. To remove the support pole 1 from the ground 100, the user may simply reverse the process in terms of the direction of the twist used to get the support pole 1 into the ground 100. The poll, rod or the like 36 may also be used to slightly adjust the height of the support pole 1 by slightly rotating the support pole 1 if the support pole 1 shifts over time.

To install a fence, a user first selects a desired location for a first pole 1. The user then inserts the pole 1 (without the need for any tools) into the ground up to approximately the ridge 82 of the spike unit 27 and then fine tune adjusts the pole 1 to the desired height by slightly twisting the pole 1 in a clockwise or counterclockwise direction. This process is repeated over and over at desired locations. Once the main poles 1 are inserted into the ground, boards, panels or the like may be used to connect the poles 1. If a pole 1 is too high or low, that pole 1 may be easily adjusted upward or downward by slightly rotating that pole 1 clockwise or counterclockwise until the boards, panels or the like align to the proper location on the pole 1.

Figure 12:
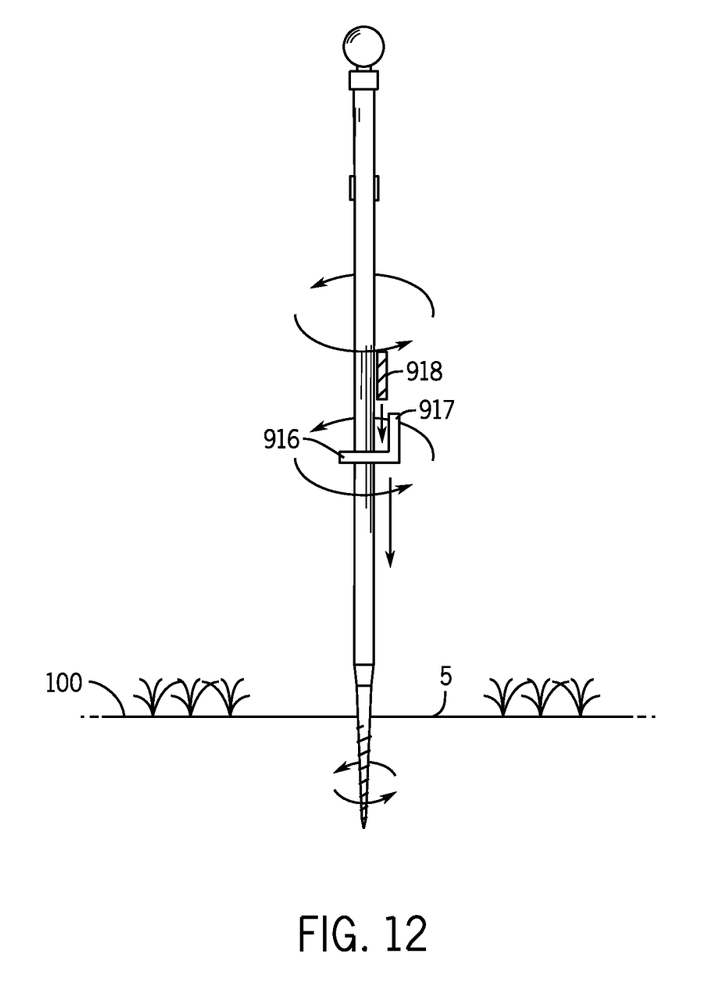
FIG. 12 illustrates an alternative embodiment wherein a rotatable collar is located on the post wherein the rotatable collar has an extended portion for receiving a board of a fence.

Finally, referring to FIG. 12, in an alternative embodiment a rotatable collar 916 may be located on the main body of the support pole 1. The rotatable collar 916 may have a central opening (not shown) similar to a washer which surrounds the main body of the support pole 1. The rotatable collar 916 may rotate three hundred and sixty degrees around the support pole 1. The rotatable collar 916 may have an extended support 917 which extends upward from the rotatable collar 916 at a ninety degree angle. As a result, a user may first insert the support pole 1 into the ground and then may adjust the rotatable collar 916 slightly left or right to so that the rotatable collar 916 aligns with and is parallel to another rotatable collar 916 located on a different support pole 1 (not shown). A board 918 (the cross-section is shown in FIG. 12) may be inserted between the extended support 917 of the rotatable collar 916 and the main body of the support pole 1. The board 918 may therein rest on a portion of the top of multiple rotatable collars 916 (on different support poles) by gravity and/or may be secured by screws or nails which pass through at least the extended support 917, the board 918 and possibly even a portion of the main body of the support pole 1. As a result, a user may easily install a fence or even a sign (which may rest on two rotatable collars 916 of two different support poles 1.)

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A support pole comprising:
   a generally cylindrical shaft unit having a top, a bottom having an opening and an exterior side surface forming a circumference;
   an interior of the generally cylindrical shaft wherein the interior of the generally cylindrical shaft is hollow;
   a solid spike unit having a top, a bottom and a generally cone-shaped exterior side wherein the top of the solid spike unit is secured to the opening of the bottom of the generally cylindrical shaft unit and wherein the generally cone-shaped exterior side of the solid spike unit has an inclined thread which allows the solid spike unit to be screwed into the ground;
   a generally circular ridge located near the top of the solid spike unit wherein the bottom of the generally cylindrical shaft unit rests on the generally circular ridge of the solid spike unit and wherein a portion of the top of the solid spike unit above the generally circular ridge of the solid spike unit is secured within the opening of the bottom of the generally cylindrical shaft unit;
   a rotatable collar surrounding the generally cylindrical shaft unit wherein the rotatable collar has an extended support which extends upward toward the top of the generally cylindrical shaft unit and wherein the rotatable collar rotates three hundred and sixty degrees around the generally cylindrical shaft unit; and
   wherein the extended support secures a board to the generally cylindrical shaft unit.

2. The support pole of claim 1 further comprising:
   an extended arm secured to the generally cylindrical shaft unit; and
   a generally planar surface attached to and located below the extended arm wherein the generally planar surface is located substantially perpendicular with respect to the generally cylindrical shaft unit.

3. The support pole of claim 2 wherein the generally planar surface is magnetic and wherein a magnetic sign, a magnetic number or a magnetic letter is temporarily secured to the generally planar surface.

4. The support pole of claim 1 further comprising:
   a plurality ridges on the exterior surface of the generally cylindrical shaft unit wherein the plurality of ridges run substantially parallel with respect to the generally cylindrical shaft unit and with respect to each other wherein the plurality of ridges increases the surface area of the exterior side surface of the generally cylindrical shaft unit.

5. The support pole of claim 1 further comprising:
   a reflective paint applied to the exterior side surface.

6. The support pole of claim 2 further comprising:
   a counter-weight located on the generally cylindrical shaft unit substantially opposite of the extended arm of the generally cylindrical shaft unit wherein the counter-weight and the extended arm are on the same axis and have substantially the same weight.

\* \* \* \* \*